United States Patent
Miyasaka

(10) Patent No.: US 11,731,242 B2
(45) Date of Patent: Aug. 22, 2023

(54) METHOD FOR SURFACE-TREATING MOLD

(71) Applicant: FUJI KIHAN CO., LTD., Nagoya Aichi (JP)

(72) Inventor: Yoshio Miyasaka, Nagoya Aichi (JP)

(73) Assignee: FUJI KIHAN CO., LTD., Nagoya Aichi (JP)

( * ) Notice: Subject to any disclaimer, the term of this patent is extended or adjusted under 35 U.S.C. 154(b) by 552 days.

(21) Appl. No.: 16/081,184

(22) PCT Filed: Feb. 1, 2017

(86) PCT No.: PCT/JP2017/003607
§ 371 (c)(1),
(2) Date: Aug. 30, 2018

(87) PCT Pub. No.: WO2017/175463
PCT Pub. Date: Oct. 12, 2017

(65) Prior Publication Data
US 2019/0022824 A1    Jan. 24, 2019

(30) Foreign Application Priority Data

Apr. 6, 2016    (JP) .................................. 2016-076588

(51) Int. Cl.
*B24C 1/06*      (2006.01)
*B24C 3/32*      (2006.01)
(Continued)

(52) U.S. Cl.
CPC .................. *B24C 1/06* (2013.01); *B24C 3/32* (2013.01); *B24C 11/00* (2013.01); *B29C 33/38* (2013.01); *C23C 8/22* (2013.01); *C23C 8/80* (2013.01)

(58) Field of Classification Search
CPC ............ B24C 1/06; B24C 1/083; B24C 11/00
(Continued)

(56) References Cited

U.S. PATENT DOCUMENTS

2012/0043044 A1* 2/2012 Mase ................... B29C 45/263
164/6
2012/0180539 A1* 7/2012 Kobayashi .............. B24C 11/00
72/17.3

FOREIGN PATENT DOCUMENTS

EP          0933447 A1     8/1999
JP          11-302826 A    11/1999
(Continued)

OTHER PUBLICATIONS

Media Blasting Charts with silicon carbide, Retrieved from the Internet in 2021. (Year: 2021).*
(Continued)

*Primary Examiner* — Joel D Crandall
*Assistant Examiner* — Makena S Markman
(74) *Attorney, Agent, or Firm* — Ronald M. Kachmarik; Cooper Legal Group LLC

(57) ABSTRACT

A method of treating a surface of a mold. A preliminary treatment of dry-ejecting an angular carbide powder against the surface of the mold so as to cause elemental carbon present within the carbide powder to be diffused into the surface of the mold. The carbide powder has particle diameters not larger than those of a 220 grit and the carbide powder being dry-ejected at an ejection pressure of 0.2 MPa or greater. An after-treatment of dry-ejecting a spherical powder against the surface of the mold to cause the spherical powder to impact the surface of the mold and form innumerable circular arc shaped fine depressions. The spherical powder has a hardness not less than the hardness of a base material of metal of the mold and particle diameters not larger than those of a 220 grit and dry-ejected at an ejection pressure of 0.2 MPa or greater.

2 Claims, 5 Drawing Sheets

(51) Int. Cl.
  *B24C 11/00* (2006.01)
  *B29C 33/38* (2006.01)
  *C23C 8/80* (2006.01)
  *C23C 8/22* (2006.01)

(58) Field of Classification Search
  USPC .......................................................... 451/38
  See application file for complete search history.

(56) References Cited

FOREIGN PATENT DOCUMENTS

| | | | | |
|---|---|---|---|---|
| JP | 05318317 | A | * 11/1999 | |
| JP | 2005-002457 | A | 1/2005 | |
| JP | 2005002457 | A | * 5/2005 | ............. C23C 24/04 |
| JP | 2006-297811 | A | 11/2006 | |
| JP | 2012-040744 | A | 3/2012 | |
| WO | 2010023714 | A1 | 3/2010 | |

OTHER PUBLICATIONS

Corresponding European Appl. No. 17778842.9, European Search Report dated Nov. 12, 2019, 6 Pages.

Corresponding International Application No. PCT/JP2017/003607, International Search Report dated Mar. 21, 2017, 4 pages.

Shinjiro Sakurai "Technical course Well-understood abrasive grains and their selection" ("Noritake Technical Journal 2020" issued by Noritake Company Limited, vol. 3 pp. 4-9), https://www.noritake.co.jp/catalog_type/download/a213b39096cee73191400cd1c84cfab3.pdf.

W. Brian Rowe "Grinding Wheel Developments" in principle of Modern Grinding Technology (second edition) (Elsevier B.V. "Green Silicon Carbide" in "Science Direct"), https://www.sciencedirect.com/topics/engineering/green-silicon-carbide.

"FAQs—Frequently Asked Questions about Silicon Carbide" in Website of Matmatch GmbH, https://matmatch.com/learn/material/faq-silicon-carbide.

Website of Kure Grinding Wheel, "Customer Support"→ "Grinding Wheel Basic Information"→ "Abrasive" https://en.kuretoishi.com/support/knowledge/abrasive/.

"FAQs" in Website of Rapid Abrasives & Accessories, https://www.rapidabrasives.ca/faqs/.

Website of Pacific Rundum Co., Ltd., http://www.rundum.co.jp/e/product/index6.html.

* cited by examiner

METHOD FOR SURFACE-TREATING MOLD

FIELD OF THE INVENTION

The present invention relates to a method of treating a surface of a mold, and in particular relates to a mold surface treatment method capable of providing a mold having good demoldability and a long lifespan.

BACKGROUND OF THE INVENTION

In molds used for molding resins or metals, when processing marks, such as cutting marks and/or polishing marks, tool marks and the like, or other indentations and protrusions have been formed on molding surfaces that contact molding materials and shape the molding materials, these indentations and protrusions are transferred onto the surface of molded articles. This not only has a detrimental effect on the appearance of molded articles, but also complicates work to remove the molded articles from molds or makes removal difficult, due to the indentations and protrusions on the molding surfaces engaging with the indentations and protrusions formed on the molded article surfaces by transfer from these indentations and protrusions.

Thus, normally after molding surfaces of molds have been processed to a predetermined shape, such as by cutting processing, these surfaces are generally given a finishing polish to achieve a mirror finish or a smooth finish.

Such finishing polishing has hitherto been performed manually by skilled workers, and so incurs a great deal of effort and time. This results in high fabrication costs of molds, and means that a long time needs to be set aside for mold fabrication.

There are proposals for methods to perform specular polishing by machine instead of such manual finishing polish performed by skilled workers.

An example of such a specular polishing method is a proposed method of ejecting an elastic abrasive, configured by adhering abrasive particles to a nucleus formed from an elastic body, so as to eject or project the elastic abrasive at an angle against a surface of a workpiece. This enables specular polishing to be achieved by causing the elastic abrasive to slide over the surface of the workpiece. There is also a proposal for a method to achieve a mirror finish by irradiating an electron beam onto a mold surface resulting from using electrical discharge processing or cutting processing so as to melt and flatten the mold surface. Five-axis-control machining centers and the like are also on the market that, after first fixing material in a chuck, are then capable of automatically performing a series of processes from machining to mirror finishing.

However, in specular polishing using an elastic abrasive as described above, although the processing time can be shortened in comparison to manual specular polishing, there is the drawback of not being able to accommodate the processing of molds of complicated shapes.

Processing devices to perform mirror-finishing by irradiating an electron beam and five-axis-control machining centers are all expensive, requiring a high initial capital investment for their introduction. Moreover, when obtaining a mirror finish by using an electron beam, the surface of the mold is melted and surface tension is used to flatten the surface of the mold before letting it solidify to obtain the mirror finish. The lifespan of the mold is accordingly shortened due to crystallization occurring at surface portions and the mold surface becoming weak to surface pressure.

Note that although it is possible to polish a surface of a mold to a mirror finish using one of the above methods, when the draft angle is decreased to approach zero for molds employed to mold resins and the like, the molded article sometimes sticks to the surface of the mold even when the mold surface has been polished to a mirror finish. This makes the molded articles difficult to remove from the mold.

Moreover, the surface of a mold is worn by frictional contact with the surface of a molded article when demolding, particularly when molding a resin molding material to which a filler such as glass, ceramic, or metal powder has been added to address demands for heat resistance and/or increased strength. This significantly reduces the wear life of the mold.

There is accordingly a great demand for a mold surface treatment method capable of obtaining a mold having both good demoldability and wear resistance, both comparatively simply and at low cost.

Note that, although not related to a mold surface treatment method, the present applicant has proposed a normal temperature carburizing treatment method to obtain improved wear resistance and the like of a metal article (Patent Document 1). This is a method to perform carburizing, which is normally thought of as heat treatment, at normal temperature. A carbide powder is ejected onto the surface of a metal article configured from a metallic material, so as to diffuse elemental carbon present within the carbide powder into the surface of the metal article.

Moreover, there is also a disclosure of such a normal temperature carburizing treatment method (see Patent Document 2). In this method, a preliminary treatment is performed on a base material of metal to form a carbon-based hard coating film, such as a diamond, diamond-like carbon (DLC), or carbon nitride layer, on a mold surface. The carbon content is thereby increased in the vicinity of the surface of the base material metal, and an improvement is achieved in the adhesion strength of the carbon-based hard coating film due to good affinity with the carbon-based hard coating film formed thereon.

PRIOR ART DOCUMENTS

Patent Documents

[PATENT DOCUMENT 1] Japanese Patent No. 3242060
[PATENT DOCUMENT 2] Japanese Patent No. 4307912

Problems to be Solved by the Invention

From out of the documents introduced as related art, in the normal temperature carburizing method described in Patent Document 1, elemental carbon present within a carbide powder can be caused to diffuse and permeate into the surface of a metal article using a comparatively simple treatment of ejecting the carbide powder onto the metal article surface using a known blasting apparatus. This thereby increases the carbon content in the vicinity of the metal article surface, increases surface hardness, and enables the wear resistance to be improved, with a method that is much simpler than known carburizing performed in conjunction with heat treatment using a carburizing furnace or the like.

However, in the normal temperature carburizing method, due to performing carburizing by ejecting the carbide powder as described above so as to impact the surface of the metal article, innumerable indentations and protrusions are formed by impact of the carbide powder on the surface of a metal article, making the surface rough. Thus although applying such a method to mold surface treatment enables the wear resistance of the mold to be increased, it is not able to improve demoldability, and would be expected to decrease demoldability in comparison to polishing a mold surface to a mirror finish.

In contrast thereto, if the carburizing treatment method described above was applied as preparatory treatment when forming a carbon-based hard coating film such as diamond or DLC on a mold, due to increasing the carbon content in the vicinity of the surface of the base material of metal by such preparatory treatment, there would be good affinity to the carbon-based hard coating film formed on top of the base metal, enabling the adhesion strength of the carbon-based hard coating film to be improved. Moreover, the surface roughness of the mold would be improved by forming the carbon-based hard coating film, and it is thought that not only would wear resistance be improved, but also demoldability would be improved.

However, due to a sputtering method or the like being employed to form the carbon-based hard coating film such as diamond or DLC, an expensive vacuum film-forming apparatus needs to be acquired to perform such film-forming. Moreover, due to the need to perform film-forming while tightly controlling conditions such as vacuum level and/or gas pressure, a comparatively long time would be required for treatment and the cost thereof would be high.

Moreover, although the carbon-based hard coating film such as diamond or DLC is formed with a high adhesion strength, were any wear or delamination of the carbon-based hard coating film to occur then the demoldability would also deteriorate.

Note that employing a release agent might be considered as a method to improve demoldability. However, although it might be expected to be possible to increase the effectiveness in preventing wear etc. occurring on the mold surface to a certain extent by employing such a release agent, concerns regarding environmental damage and the like dictate that the use of release agents should preferably be reduced by as much as possible.

The present invention accordingly solves the deficiencies of related technology as described above. An object of the present invention is to provide a method of treating a surface of a mold, the method being capable of achieving better demoldability than polishing to a mirror finish, while moreover being able to obtain at the same time both an improvement in demoldability and an improvement in surface hardness of the mold at low cost and in a short period of time using an extremely simple treatment, and as a result enabling the amount of release agent used to also be reduced.

Means for Solving the Problem

To solve the above problems, a method for treating a surface of a mold of the present invention comprising:

a preliminary treatment process of dry-ejecting an angular carbide powder against a surface of a mold so as to cause elemental carbon present within the carbide powder to be diffused into the mold surface and prepare the mold surface, the carbide powder having particle diameters not larger than those of a 220 grit particle distribution as defined by JIS R6001 (1987) and the carbide powder being dry-ejected at an ejection pressure of 0.2 MPa or greater, and an after treatment process of dry-ejecting a spherical powder against the mold surface after treatment by the preliminary treatment so as to cause the spherical powder to impact the mold surface and form circular arc shaped depressions in the mold surface, the spherical powder having a hardness not less than the hardness of a base metal of the mold and particle diameters not larger than those of a 220 grit particle distribution as defined by JIS R6001 (1987) and being dry-ejected at an ejection pressure of 0.2 MPa or greater.

Note that for the mold to be treated by the method of the present invention, effective application is made to molds employed for molding resins, and in particular to molds employed for molding resins having elasticity, such as elastomers, rubbers, and the like.

Effect of the Invention

Due to the configuration of the present invention as described above, the following significant effects can be obtained by a mold treated by the surface treatment of the method of the present invention.

In the preliminary treatment, by dry-ejecting the angular carbide powder having particle diameters not larger than those of 220 grit at an ejection pressure of 0.2 MPa or greater, surface preparation work to remove electrical discharge hardened layers and/or softened layers generated on the mold surface by electrical discharge processing or cutting processing, and to remove directional processing marks (cutting marks, polishing marks, tool marks, and the like) generated during processing such as machining, grinding, and polishing, can be performed relatively simply and in a short period of time. Moreover, elemental carbon present within the carbide powder can be caused to diffuse and permeate into the surface of the mold, enabling the surface hardness of the mold to be increased.

The surface roughness of the mold is then improved by dry-ejecting the spherical powder, which has a hardness not less than the base metal hardness of the mold. The spherical powder has particle diameters not larger than those of 220 grit, and is ejected at an ejection pressure of 0.2 MPa against the mold surface after the preliminary treatment has been performed, so as to form innumerable circular arc shaped fine depressions in the mold surface. Moreover, due to momentary heat treatment of impacted portions of the mold surface, accompanying the generation of heat when impacted by the spherical powder and subsequent cooling, a further increase in mold surface hardness can be obtained, and the demoldability can be further improved.

Thus the present invention is, by using a comparatively simple configuration of ejecting two types of powder before and after each other, able to achieve the advantageous effects of extended lifespan due to increasing the mold surface hardness and improved demoldability with a low cost and short duration treatment.

Moreover, being able to improve the demoldability and lifespan of the mold by surface treatment performed by blast processing in this manner, the amount of release agent employed can be reduced, and in some cases the use of release agent can be eliminated altogether. A reduction in cost of molding is accordingly possible, and molding can be performed by a method that has only a small impact on the environment.

Moreover, the surface treatment described above extends the lifespan of the mold and/or improves the demoldability thereof, reducing the defect rate, and enabling a large reduction in molded article production costs. Furthermore, mold finishing processing, which hitherto was achieved by manual specular polishing, can be performed by finishing using blast processing, except for molds of special applications. Due to savings from not needing to perform manual polishing, a large reduction in costs of mold fabrication can be achieved, and short delivery lead time can be achieved.

Moreover, with molds for molding resins, and in particular with molds employed for molding elastic bodies such as rubbers or elastomers, defective molding are caused more by a drop in demoldability arising due to dirt than by the lifespan of the mold. This means that there is a need to periodically remove such resin-molding molds from an extruder or the like and to clean such molds. However, molds subjected to surface treatment using the method of the present invention have good demoldability, and dirt is not liable to adhere thereto. This means that the number of times cleaning is performed can be greatly reduced, and enables a reduction in manufacturing costs of products due to being able to raise productivity.

BRIEF DESCRIPTION OF DRAWINGS

FIG. 4A illustrates a carbide powder employed in the preliminary treatment process (400 grit SiC: 100 times); FIG. 4B illustrates a spherical powder (400 grit FHB: 100 times) employed in the after treatment process.

EMBODIMENTS TO CARRY OUT THE INVENTION

Figure 1A:
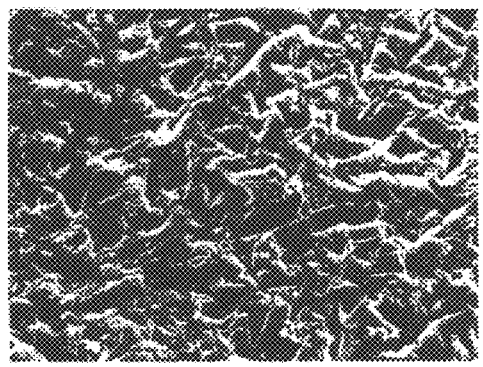
FIG. 1A is an electron micrograph (500 times) of a surface of a test strip after a preliminary treatment process.

Explanation follows regarding an embodiment of the present invention, with reference to the appended drawings.

Overall Configuration

The method of treating a surface of a mold of the present invention is a method configured by a preliminary treatment process of dry-ejecting an angular carbide powder against a mold surface, and by a after treatment process of dry-ejecting a spherical powder having a hardness not less than that of a base metal of the mold against the mold surface after treatment by the preliminary treatment.

Mold

A mold subject to treatment by the surface treatment method of the present invention may be anything employed as a so-called "mold". The present invention is applicable to molds for various applications, such as for molding metal, molding resins, or the like, with no particular limitation to the substance of the material to be molded.

Moreover, molds subject to treatment by the surface treatment method of the present invention include closed molds (molds) that shape a molding material poured into a cavity formed inside the mold, such as molds for injection molding and molds for blow molding, and also open molds (dies) without closed cavities, such as press molds, draw dies, and the like.

Various substances known as base metals for molds may be employed as the base metal of the mold, such as pre-hardened steel, quench and tempered steel, drawn hardened steel by pultrusion method, corrosion-resistant steel, non-magnetic steel, and the like. Molds made from substances other than steel, such as molds made from non-ferrous metals, are also applicable for the mold.

Note that the problem of a deterioration in demoldability when the draft angle is close to zero is particularly significant in molds for resin materials, which incur a large amount of shrinkage during cooling. Such sticking is significant on the core (convex mold) side of a closed mold (mold). The surface treatment of the present invention is accordingly effectively applied in the surface treatment of the core side of a closed mold (mold) employed for resin molding. However, there is no limitation thereto, and the surface treatment is applicable to the treatment of any of the surfaces of a mold which are surfaces at portions that come into contact with the molding material.

Preliminary Treatment Process

In the present process, angular carbide powder is dry-ejected against the surface of the mold, so as to prepare the surface by removing an electrical discharge hardened layer and/or softened layer arising on the mold surface due to electrical discharge processing or cutting processing during mold fabrication, or by removing directional processing marks (cutting marks, polishing marks, tool marks and the like) generated during machining, grinding, and polishing processes. In addition thereto, elemental carbon present within the carbide powder is caused to diffuse and permeate into the surface of the mold, so as to perform carburizing at normal temperatures.

Examples of carbide powders that may be employed include the powders of carbon containing substances, such as $B_4C$, SiC (SiC($\alpha$)), TiC, VC, graphite, diamond, and the like. SiC is preferably employed therefor, and SiC($\alpha$) is more preferably employed therefor.

Figure 4A:
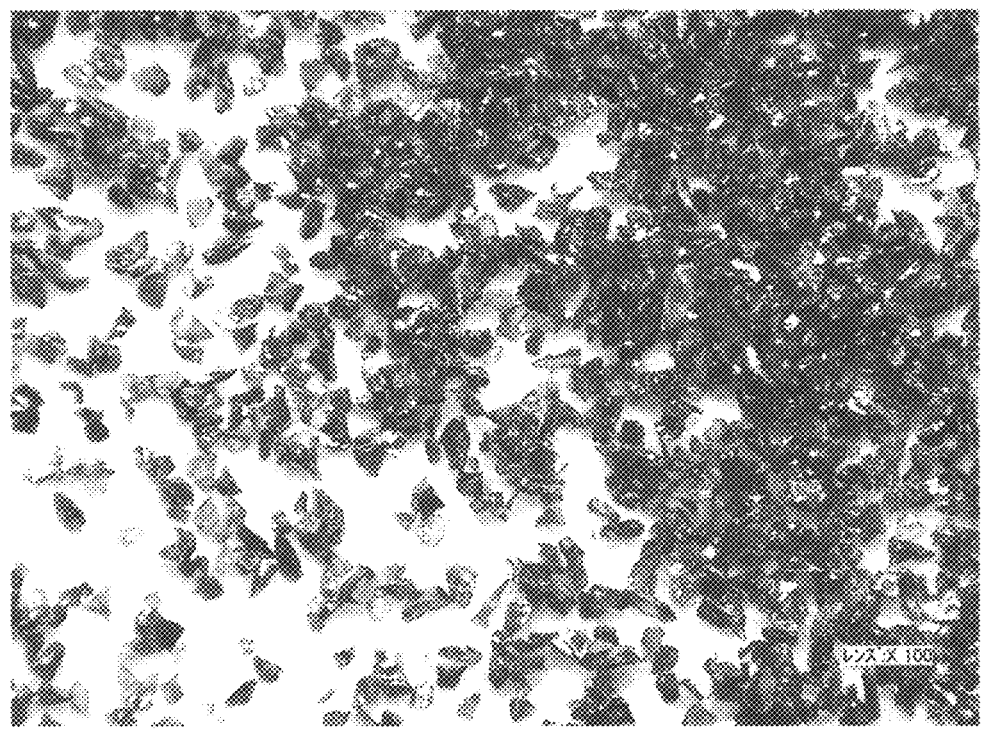
FIGS. 4A and 4B are photographs illustrating the form of particles of ejection powder.

With regard to the angular carbide powder, in order to be able to exhibit a cutting force capable of removing electrical discharge hardened layers and/or softened layers referred to above, and removing directional processing marks, within a comparatively short period of time, an angular powder such as that illustrated in the example in FIG. 4A may be employed therefor.

Such an angular carbide powder can be obtained, for example, by crushing and then sieving out a sintered carbide-based ceramic.

In order to achieve the ejection velocity needed to obtain diffusion and permeation of the elemental carbon, the particle diameters of the powder employed are particle diameters not larger than those of a 220 grit particle distribution as defined by JIS R6001 (1987), and preferably so-called "fine particles" having particle diameters not larger than those of 240 grit are employed therefor.

Various known blasting apparatuses capable of dry-ejecting a powder may be employed as the method for ejecting such a carbide powder onto an article to be treated. An air blasting apparatus is preferably employed therefor due to the comparative ease with which the ejection velocity and/or the ejection pressure can be adjusted.

A direct pressure blasting apparatus, suction gravity blasting apparatus, or various other types of blasting apparatus may be employed as such an air blasting apparatus. Any of these types of blasting apparatus may be employed, and the type thereof is not particularly limited as long as it has the performance capable of dry-ejecting at an ejection pressure of 0.2 MPa or above.

When a carbide powder as described above is dry-ejected at high speed using such a blasting apparatus against a mold surface at portions of the mold surface that will contact with the molding material, electrical discharge hardened layers and/or softened layers, directional processing marks, and the like arising during mold fabrication from electrical discharge processing and/or cutting processing are removed so as to prepare a non-directional mold surface.

Moreover, the impact of the carbide powder against the mold surface causes localized temperature rises on the mold surface at portions impacted by the carbide powder. The carbide powder is also heated and undergoes thermal decomposition. As the elemental carbon present within the carbide of the carbide powder diffuses and permeates into the mold surface, the carbon content of these portions increases, and the hardness of the mold surface after performing the preliminary treatment process is greatly increased.

In the preliminary treatment of the present invention, the carbide powder undergoes thermal decomposition due to the temperature of the carbide powder rising when the carbide powder is caused to impact an article to be treated in this manner. The carburizing treatment is accordingly performed by thus generated elemental carbon present within the carbide powder accordingly diffusing and permeating into the article to be treated.

According to the preliminary treatment of this method, the diffusion and permeation of elemental carbon into the mold is most significant at the greatest proximity to the surface, with this also resulting in a great increase the carbon content. The carbon content increases due to diffusion toward the inside of the article to be treated. This results in the generation of a graded and gradually structure in which the carbon content gradually decreases with depth from the surface of the article to be treated, with the carbon content decreased to that of an untreated state by a certain depth.

The carbide powder and the article to be treated undergo a partial rise in temperature when the carbide powder impacts the article to be treated. However, the rise in temperature is only localized and momentary. Distortion, phase transformation, or the like in the article to be treated, such as that caused by heat treatment in an ordinary carburizing treatment performed by heating the entire mold in a carburizing furnace, is accordingly not liable to occur. Moreover, higher adhesion strength is achieved due to the generation of fine carbides, and an irregular carburized layer is not generated.

In order to explain more precisely the principles of elemental carbon diffusion and permeation by such blasting, a comparison follows regarding an example of gas carburizing treatment as normally performed. An ordinary gas carburizing method employs as a source of carburizing atmosphere gas a hydrocarbon gas such as methane ($CH_4$), propane ($C_3H_8$), or butane ($C_4H_{10}$), mixed with air at a certain ratio.

When this gas mixture is heated, carbon monoxide (CO), hydrogen ($H_2$), and nitrogen ($N_2$) are generated by an endothermic reaction. Carburizing is mainly performed by CO gas undergoing thermal decomposition to generate activated carbon as expressed by the following equation, and by the activated carbon reacting with Fe present in the steel.

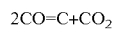

$2CO=C+CO_2$

Namely, a reaction cannot be caused directly between Fe present in the steel and CO gas merely by physically attaching CO gas to a steel base metal surface so that it cannot be easily removed simply by using external pressure or some other physical method. However, if additional energy other than heat of a certain amount or greater is imparted thereto, then the CO gas is activated and adsorbed onto the surface of the Fe. The CO gas that has been activated and adsorbed then performs thermal decomposition into carbon dioxide and carbon. The activated carbon generated is heated to about 1000° C. by such a reaction. A carburizing phenomenon can be thought of occurring by the activated carbon diffusing into a Fe lattice in steel, which has a face-centered cubic γ structure, so as to achieve a solid solution of C.

In gas carburizing treatment, due to the Fe in the steel having a face-centered cubic γ structure enabling a solid solution of C to be formed as described above, carbon readily diffuses and permeates into the article to be treated if the entire steel material configuring the article to be treated is uniformly heated. Although it depends on conditions, the thickness of the carburized layer is comparatively thick at about 1 mm to about 1.5 mm, and as it is difficult to form a gradually structure on the base metal in which the increased carbon content gradually decreases on progression inwards, such as achieved by performing the preliminary treatment of the present application as described above.

Taking the phenomenon of conventional gas carburizing treatment as being as described above, then the preliminary treatment of the present invention can be thought of as being a carbon diffusion phenomenon as described below.

For example, carbide powder is ejected against a mold surface formed from a carbon steel, and the carbide powder that has impacted against the base metal surface of the article to be treated then rebounds, with a slower velocity after impact. However, although the ratio of velocities pre-impact and post-impact, namely the coefficient of restitution, differs according to the substance and hardness of the article to be treated, under the law of conservation of energy, the lost kinetic energy is, other than noise, mainly converted into heat energy. Heat energy can be thought of as being internal friction arising from deformation of the impacted portion of the article to be treated when impacted. However, conversion to heat only occurs at the deformed portion of the article to be treated impacted by the carbide powder ejected at normal temperature. This accordingly results in a partial high temperature at portions of the mold surface impacted by the carbide powder. Moreover, these impacted portions only have an extremely small surface area that corresponds to the powder particle diameter, and so these impacted portions undergo repeated rapid heating and rapid cooling. It is thought that when this occurs, the carbide powder side undergoes thermal decomposition due to also being heated at the surface of the article to be treated, and activated carbon within the carbide powder is actively adsorbed into the article to be treated, and diffuses therein.

Moreover, it is thought that in the base metal preliminary treatment method of the present invention, in which the article to be treated is not uniformly heated as in ordinary carburizing, although the article to be treated is partially heated by impact with the carbide powder, this heating occurs in a localized manner at portions on the surface where the carbide powder impacts. The effect of heat generated by impact rapidly reduces on progression inwards inside the article to be treated. This means that in the preliminary treatment by the method of the present invention, the diffusion of carbon becomes more difficult the further inside from the surface of the mold. This results carburizing being performed such that the carbon content decreases on progression toward the inside, thereby performing carburizing conforming to the gradually structure described above.

Moreover, the carbide powder employed in the present invention is made from one of the carbides described above. These carbides generally have a low density compared to metals (for example, SiC: 3.2 g/cm³; B₄C: 2.5 g/cm³), and so even if they are ejected at high speed against the molds there is little deformation at impact. The present invention accordingly enables carburizing treatment to be performed with little mold deformation compared to conventional gas carburizing treatment methods and the like in which the entire mold needs to be heated to a high temperature.

After Treatment Process

The present process is further additional processing performed after the mold surface has been treated with the preliminary treatment process as described above. The present process is performed to achieve a surface profile that improves the demoldability by dry-ejecting a spherical powder against the mold surface resulting from the preliminary treatment so as to form innumerable fine depressions having a circular arc shape on the mold surface, and so as to further increase the surface hardness.

There are no particular limitations to the substance of the spherical powder employed therefor, as long as the spherical powder has a hardness that is not less than the hardness of the mold to be treated. For example, as well as spherical powders made from various metals, a spherical powder made from a ceramic may be employed, and a spherical powder made from a similar substance to the carbide powders described above (i.e. a carbon containing substance) may also be employed therefor.

Figure 4B:
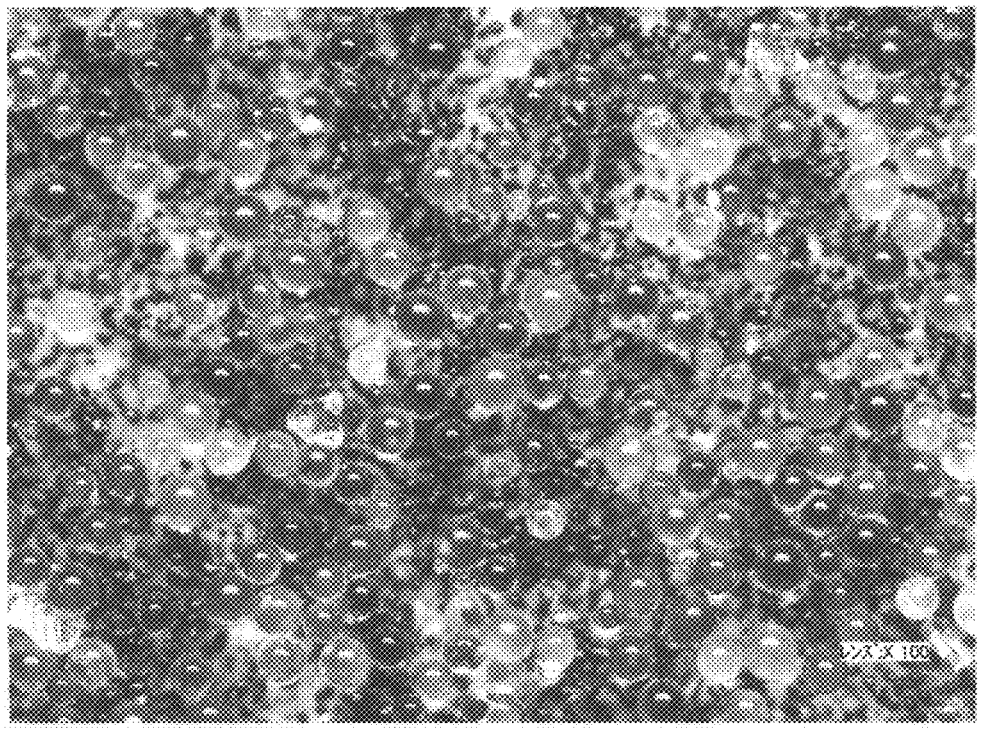

The spherical powder employed is spherical (see FIG. 4B) to an extent that enables innumerable fine indentations having a circular are shape as described above to be formed on the mold surface.

Such spherical powders can be obtained by atomizing methods when the substance of the powder is a metal, and can be obtained by crushing and then melting when the substance of the powder is a ceramic. In order to achieve the ejection velocity needed to plastically deform the mold surface by impact to form semi-circular indentations (dimples), the particle diameters of the powder employed therefor are particle diameters not larger than those of a 220 grit particle distribution as defined by JIS R6001 (1987), and preferably "fine particles" having particle diameters not larger than those of 240 grit are employed therefor.

Moreover, various known blasting apparatuses with dry-ejection capabilities, similar to those explained with respect to the ejection method for carbide powder when explaining the preliminary treatment process, may be employed as the method for ejecting the spherical powder onto the mold surface in such a manner. The type and the like of the blasting apparatus is not particularly limited, as long as it has the performance capable of ejecting at an ejection pressure of 0.2 MPa or above.

The spherical powder described above is ejected by such a blasting apparatus against the surface of portions of the mold surface that have already been subjected to the preliminary treatment process.

Due to the impact of the spherical powder, plastic deformation is induced to occur on the mold surface at the portions impacted by the spherical powder. The surface roughness is improved, and demoldability is also improved. This is achieved by collapsing the indentations and protrusions having acute apexes that were formed on the mold surface in the cutting achieved by impacting the angular carbide powder in the preliminary treatment process, and by randomly forming innumerable depressions (dimples) with circular arc shapes over the entire mold surface.

Moreover, due to the heat generated when impacted by the spherical powder, the impacted portions experience momentary local heating and cooling. Accompanying the momentary heat treatment, fine crystals are also formed at the mold surface and the mold surface undergoes work hardening due to plastic deformation when the circular arc shape depressions are formed. The surface hardness of the mold is thereby further increased from that of the state after the preliminary treatment process. Moreover, due to a compressive residual stress being imparted by the plastic deformation of the surface, this is also thought at the same time to contribute to an increase in the fatigue strength and the like of the mold, in an effect obtained by so-called "shot pinning".

Explanation follows regarding results of tests related to the surface treatment method of the present invention performed as Examples.

Surface Hardness/Surface Roughness Confirmation Test

Test Summary

Differences in surface hardness and surface roughness were measured for:

an untreated test strip;

a test strip subjected to angular carbide powder ejection (equivalent to the preliminary treatment) alone;

a test strip onto subjected to spherical powder ejection (equivalent to the after treatment) alone; and a test strip subjected to both angular carbide powder ejection (equivalent to the preliminary treatment) and spherical powder ejection (equivalent to the after treatment).

Test Strip

A commercially available Almen test strip (N strip) was employed as the test strip. The specification published by the manufacturer of the Almen strip is listed in Table 1 below.

TABLE 1

Test Strip (Almen Strip)

| Material | Hardness | Thickness (mm) | Flatness (mm) |
|---|---|---|---|
| JIS G 3311 (special polishing steel/SK Material) quench and tempered product | HRC48 (HV480) | 0.787 ± 0.025 | ±0.025 |

Treatment Method

A gravity blasting apparatus ("SGK-4" manufactured by Fuji Manufacturing Co., Ltd.) mounted with a nozzle having a 9 mm nozzle diameter was employed to perform blasting under the treatment conditions listed in Table 2 below.

TABLE 2

| Treatment | Ejection Powder | Particle Size | Ejection Pressure (Mpa) |
|---|---|---|---|
| Preliminary treatment alone | Carbide powder: SiC (angular) | 400 grit | 0.3 |
| After treatment alone | Spherical powder: ceramic (spherical) | 400 grit | 0.3 |
| Preliminary treatment + after treatment | Carbide powder: SiC (angular) | 400 grit | 0.3 |
| | Spherical powder: ceramic (spherical) | 400 grit | 0.3 |

Note that the spherical powder employed in the after treatment is 400 grit (particle diameters from 38 μm to 53 μm) ceramic hard beads ("FHB" series manufactured by Potters Ballotini Co., Ltd).

The composition and physical properties of the spherical powder are listed in Table 3.

TABLE 3

Composition and Physical Properties of "400 grit FHB"

| | SiO$_2$ | Al$_2$O$_3$ | B$_2$O$_3$ | Fe$_2$O$_3$ | Na$_2$O | K$_2$O | MgO | CaO |
|---|---|---|---|---|---|---|---|---|
| Component (%) | 55.5 | 14.0 | 5.7 | 0.2 | 0.5 | | 1.0 | 23.1 |
| Particle Diameter (μm) | | | | From 38 μm to 53 μm | | | | |
| Density (g/cc) | | | | 2.60 | | | | |
| Mohs Hardness (Vickers Hardness) | | | | 7.5 (HV 800) | | | | |

Measurement Results

The results of measuring surface hardness and surface roughness (arithmetic mean roughness Ra and ten-point mean roughness Rz, both as defined in JIS B 0601 (1994)) of the test strips subjected to each of the above treatments using a contact method are listed in Table 4.

Figure 3:
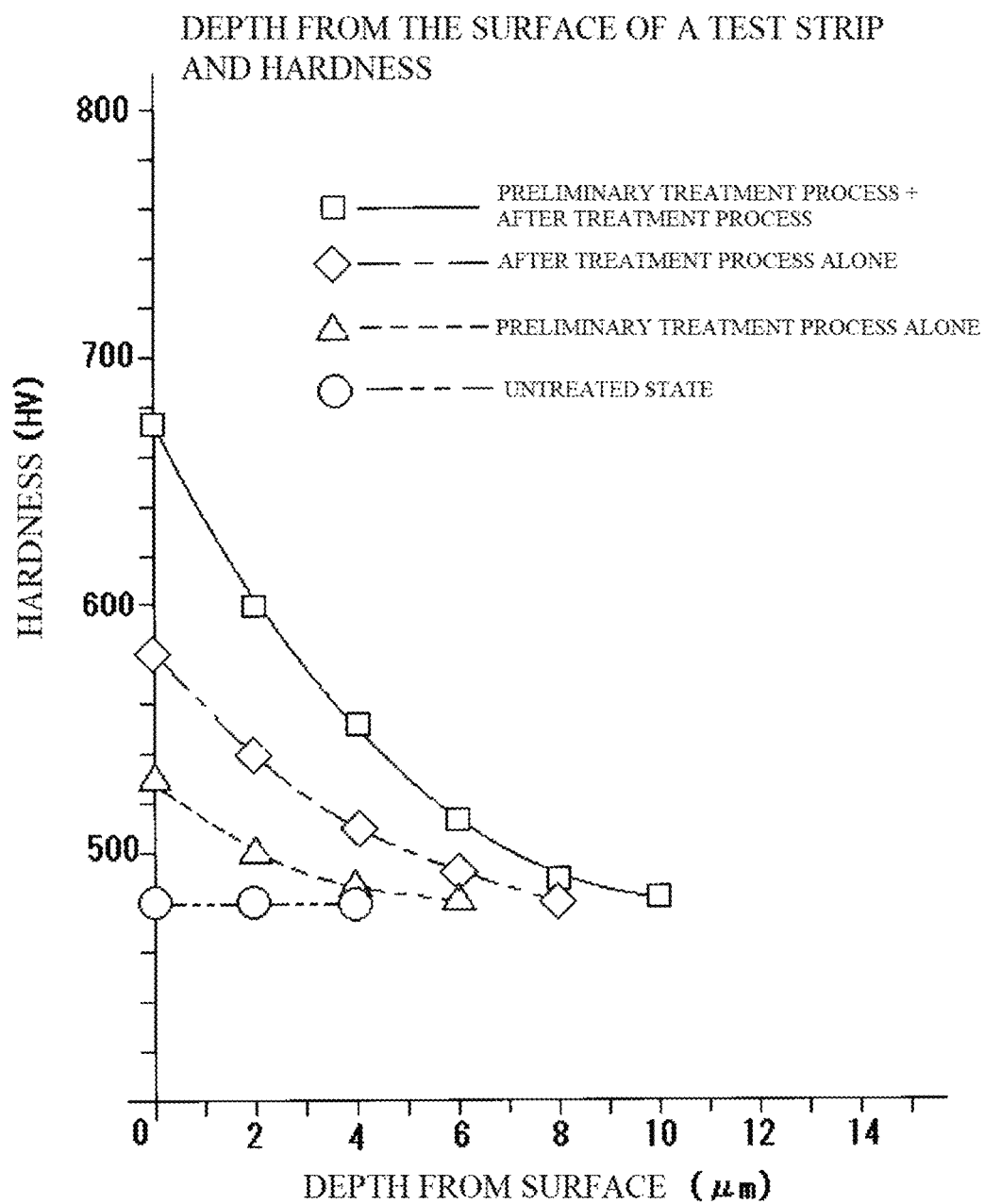
FIG. 3 is a graph illustrating a relationship between depth from the surface of a test strip and hardness (a graph of confirmed test results of surface hardness and surface roughness).

Moreover, a relationship between depth from the surface and hardness of the test strip is illustrated in FIG. 3.

TABLE 4

Measurement Results of Surface Hardness and Surface Roughness

| Treatment | Surface Hardness | Surface Roughness (μm) | |
|---|---|---|---|
| | | Ra | Rz |
| Untreated | HRC48 (HV480) | 0.07 | 0.503 |
| Preliminary treatment alone | HV530 | 0.325 | 2.302 |
| After treatment alone | HV580 | 0.232 | 1.684 |
| Preliminary treatment + after treatment | HV670 | 0.211 | 1.436 |

Interpretation

Preliminary Treatment Alone

It was confirmed that the surface hardness was increased even for test strips treated with the preliminary treatment alone in which angular carbide powder (SiC) is ejected against the test strips, by what is thought to be diffusion and permeation (carburizing) of elemental carbon from within the carbide powder (SiC). However, this increase in surface hardness peaked at HV 50.

Figure 1B:
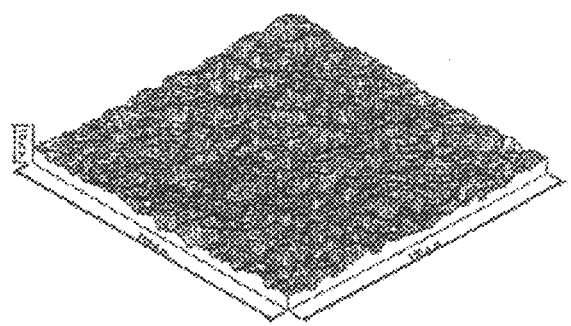
FIG. 1B is an enlargement of the test strip surface after carbide powder ejection.

The surface of a test strip after angular carbide powder (SiC) ejection is illustrated in FIG. 1A and FIG. 1B. The surface roughness increased for the surfaces of test strips after carbide powder ejection, with this being the roughest surface state from out of the test strips subjected to each of the treatments described above (see Table 4).

After Treatment Alone

Compared to untreated test strips, an increased surface hardness of HV 100 was obtained by the after treatment alone in which a spherical powder is ejected against the test strips, by what is thought to be momentary heat treatment (see Table 4).

Moreover, although the surface roughness was increased for surfaces of test strips after spherical powder ejection relative to untreated test strips, the surface roughness was lower than surfaces of test strips after performing the preliminary treatment alone by angular carbide powder ejection (see Table 4).

Complex Treatment (Combination of Preliminary Treatment and after Treatment)

Compared to untreated test strips, the surface hardness was increased by 190 HV by performing complex treatment, combining the preliminary treatment of angular carbide powder ejection with the after treatment of spherical powder ejection against the surface resulting from the preliminary treatment. The hardness was increased the most thereby in what is thought to be a combined effect of carburizing in the preliminary treatment and momentary heat treatment in the after treatment.

Figure 2A:
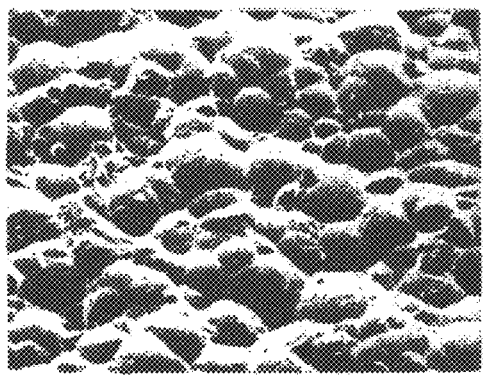
FIG. 2A is an electron micrograph (500 times) of a surface of a test strip after an after treatment process.
Figure 2B:
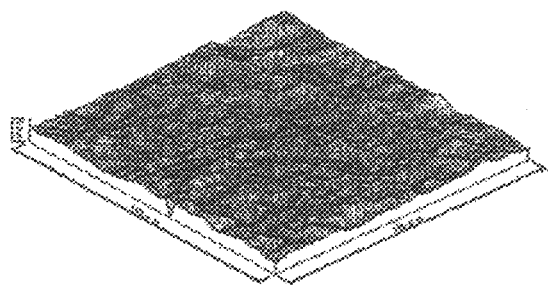
FIG. 2B is an enlargement of the test strip surface after spherical powder ejection.

The surfaces of a test strip after spherical powder ejection is illustrated in FIG. 2A and FIG. 2B. The surface roughness of the test strip after the complex treatment is greatly improved compared to that of the test strip subjected to the preliminary treatment alone (FIG. 1A and FIG. 1B). Moreover, a small improvement was also observed compared to a test strip subjected to the after treatment alone (see Table 4).

Focusing just on the surface roughness after treatment, then comparatively close values were obtained by either performing the complex treatment of the preliminary treatment and the after treatment, or by omitting the preliminary treatment process of angular carbide powder ejection and performing the after treatment of spherical powder ejection alone.

However, a long processing time is needed in cases in which the preliminary treatment processes is omitted and an attempt is made to employ spherical powder ejection alone to eliminate processing marks generated on the surface of the test strip. Performing the treatment by spherical powder ejection, as in the complex treatment described above, eliminates processing marks and the like generated on the surface of the test strip by angular carbide powder ejection in the preliminary treatment so as to achieve a directionless surface, and in addition enables the overall processing time to be shortened.

Moreover, due to performing carburizing by carbide powder ejection in the preliminary treatment and due to the momentary heat treatment by performing the after treatment, an increase in hardness could be obtained that exceeds a sum of values of increases in hardness when each of the preliminary treatment and the after treatment was performed independently. It was accordingly confirmed that an increase in hardness could be obtained than that of indicated a synergistic effect from the two treatments.

As illustrated in FIG. 3, an increase in surface hardness that occurred after carbide powder ejection was greatest at surface portions of the test strip, and gradually drops with increasing depth from the surface so as to finally become the hardness of an untreated base metal. This is postulated to be because in carburizing of the test strip, the carbon content gradually decreases with depth from the surface of the article to be treated as far as a carbon content of an untreated state at a certain depth, so as to give the gradually structure described above.

Mold Lifespan and Demoldability Confirmation Tests

Test Summary

For four molds for different types of application, the surface hardness, lifespan, and demoldability were compared for molds subjected to the following treatment:

not subjected to blast processing (polished mold or machined mold);

subjected to angular carbide powder ejection and spherical powder ejection (Examples); and subjected to spherical powder ejection alone (Comparative Examples).

To evaluate lifespan, resin molding was performed using the untreated mold and each of the molds subjected to the respective treatments for the Examples and the Comparative Examples, and the lifespan was evaluated by the number of molding cycles at the point of time when defective molding or demolding problem(s) is/are occurred.

The demoldability was evaluated by visual inspection of the state of adherence to the mold surface of the molded article and the molding material, and by visual inspection of the generation or non-generation of defective molding.

Treatment Conditions

The molds subjected to the treatments in Examples 1 to 4, and the treatment conditions of the carbide powder ejection treatment (preliminary treatment) and the spherical powder ejection treatment (after treatment) performed on each of the molds are listed in Table 5 below.

The blasting apparatus employed in each treatment was a gravity blasting apparatus ("SGK-4" manufactured by Fuji Manufacturing Co., Ltd.).

In Comparative Examples 1 to 4, the treatment corresponding to the "after treatment" of Examples 1 to 4 was performed alone. However, in the Comparative Examples 1 to 4, the duration of spherical powder ejection was extended compared to that of the "after treatment" in each of the Examples, so as to perform ejection until processing marks had been eliminated. The ejection duration for each of these Comparative Examples are shown by bracketed figures in the "ejection duration" column of "after treatment" in Table 5 below.

TABLE 5

Mold Treated and Treatment Conditions

| | Mold | | | Treatment Conditions | | |
|---|---|---|---|---|---|---|
| No. | Application | Dimensions (mm) | Substance (Hardness) | | Preliminary treatment | After treatment |
| 1 | For molding urethane elastomer | Length: 500 Width: 500 Depth: 20 | Pre-hardened steel ("NAK 55", manufactured by Daido Steel Co., Ltd) (HV400) | Ejection powder | F220 SiC | 300 grit Heiss |
| | | | | Ejection pressure | 0.3 MPa | 0.4 MPa |
| | | | | Nozzel diameter | φ9 mm | φ9 mm long |
| | | | | Ejection distance | 100 to 150 mm | 100 to 150 mm |
| | | | | Ejection duration | about 5 minutes | about 5 minutes (about 13 minutes) |
| 2 | For molding NYLON (glass impregnated.) | Length: 500 Width: 250 Depth: 30 | Stainless steel SUS420J2 ("STAVAX", manufactured by Uddeholm Co., Ltd.) (HV560) | Ejection powder | 400 grit SiC | 500 grit FHB |
| | | | | Ejection pressure | 0.3 MPa | 0.4 MPa |
| | | | | Nozzel diameter | φ9 mm | φ9 mm long |
| | | | | Ejection distance | 100 to 150 mm | 100 to 150 mm |
| | | | | Ejection duration | about 4 minutes | about 4 minutes (about 10 minutes) |
| | | | | | In addition: a light polish with an elastic abrasive was given after the after treatment. | |
| 3 | For molding polypropylene | Length: 450 Width: 600 Depth: 20 | SKD-11 (High temperature tempering) (HV700) | Ejection powder | F220 SiC | 400 grit FHB |
| | | | | Ejection pressure | 0.3 MPa | 0.4 MPa |
| | | | | Nozzel diameter | φ9 mm | φ9 mm long |
| | | | | Ejection distance | 100 to 150 mm | 100 to 150 mm |
| | | | | Ejection duration | about 5 minutes | about 5 minutes (about 12 minutes) |

TABLE 5-continued

Mold Treated and Treatment Conditions

| | Mold | | | Treatment Conditions | |
|---|---|---|---|---|---|
| No. | Application | Dimensions (mm) | Substance (Hardness) | Preliminary treatment | After treatment |
| 4 | For molding rubber | Length: 450 Width: 450 Depth: 20 | Pre-hardened steel ("NAK 55", manufactured by Daido Steel Co., Ltd) (HV400) | Ejection powder  Ejection pressure  Nozzle diameter  Ejection distance  Ejection duration | F220 SiC  0.4 MPa  φ9 mm  100 to 150 mm  about 5 minutes | 300 grit Heiss  0.4 MPa  φ9 mm long  100 to 150 mm  about 5 minutes (about 13 minutes) |

(3) Test Results

The results of measuring surface hardness, lifespan, and demoldability for molds not subjected to blast processing (polished molds or machined molds), the molds of the Examples (Examples 1 to 4), and the molds of the Comparative Examples (Comparative Examples 1 to 4) are listed in Table 6 below.

TABLE 6

Lifespan and Demoldability of each Mold

| | | | Measurement Results | | |
|---|---|---|---|---|---|
| Mold No. | Application | Treatment Method | Surface Hardness | Lifespan | Demoldability |
| 1 | For molding urethane elastomer | Polished mold | HV400 | 200,000 cycles | Bad (many defects) |
| | | Example 1 | HV520 | 400,000 cycles | Good (few defects) |
| | | Comparative Example 1 | HV480 | 300,000 cycles | Slightly good (many defects) |
| 2 | For molding NYLON (glass impregnated) | Polished mold | HV560 | 70,000 cycles | Bad (often sticks) |
| | | Example 2 | HV730 | 150,000 cycles | Good |
| | | Comparative Example 2 | HV650 | 100,000 cycles | Good |
| 3 | For molding polypropylene | Polished mold | HV700 | 100,000 cycles | Quite bad |
| | | Example 3 | HV900 | 200,000 cycles | Good |
| | | Comparative Example 3 | HV800 | 150,000 cycles | Good |
| 4 | For molding rubber | Machined mold | HV400 | 50,000 cycles | Bad (many defects) |
| | | Example 4 | HV600 | 50,000 cycles | Good |
| | | Comparative Example 4 | HV500 | 50,000 cycles | Quite good |

Interpretation

Treatment Duration

In the Comparative Examples 1 to 4, in order to eliminate processing marks remaining on the mold surface and to achieve a directionless surface using spherical powder ejection alone, the spherical powder ejection needed to be performed for a longer time than the total time of the sum of ejection durations for the preliminary treatment and the after treatment performed for the corresponding Example 1 to 4. This confirmed that performing two stages of treatment as in the present invention, i.e. the preliminary treatment and the after treatment, is advantageous in shortening processing time.

Surface Hardness and Lifespan

It was confirmed that relative to a polished mold or machined mold, the surface hardness and lifespan were both increased for the molds of Examples 1 to 4 and the molds of Comparative Examples 1 to 4. However, there was a large increase in the surface hardness and lifespan for the molds of Examples 1 to 4 compared to those of the Comparative Examples 1 to 4. This confirmed that performing two stages of surface treatment as in the present invention, i.e. the preliminary treatment and the after treatment, is advantageous to increasing mold surface hardness and lifespan.

Note that due to employing the Heiss steel (carbon 1.3%), which is a carbide steel, as the spherical powder in Example 1 and Comparative Example 1, the ejection of such a spherical powder resulted in carburizing being performed at the same time as forming fine spherical shaped depressions in the mold surface and performing momentary heat treatment. It can be postulated that the increase in surface hardness was obtained by the synergistic effect of carburizing and momentary heat treatment.

However, in the mold of Comparative Example 1 in which it is postulated that the hardness is increased by the synergistic effect of such carburizing and momentary heat treatment, the surface hardness and lifespan is inferior compared to that of the mold in Example 1. Hence, in comparison to cases in which the effects of carburizing and momentary heat treatment are imparted at the same time by a single treatment, splitting treatment into the preliminary treatment processes and the after treatment process, as in the present invention, by the complex treatment in which carburizing is performed in the preliminary treatment processes, and then momentary heat treatment and circular arc shaped depression forming is performed in the after treatment, has been confirmed to shorten the total treatment duration as described above. Moreover, such an approach also enables an even greater effect to be obtained in increasing surface hardness, and obtaining an accompanying lengthening of lifespan.

Surface Roughness and Demoldability

Although the surface roughness is increased compared to a polished mold in all of the Examples 1 to 4 and the Comparative Examples 1 to 4, improved demoldability was confirmed in all cases compared to a polished mold. The treatment of the mold surface by spherical powder ejection was also confirmed to be effective in improving the demoldability of the molds in comparison with the treatment by specular polishing.

It was confirmed that good demoldability was obtainable in both the Examples and the Comparative Examples for Example 2 and Comparative Example 2 in which the treated mold is a mold for molding NYLON, which is known as a resin having self-lubricating properties, and for Example 3 and Comparative Example 3 in which the treated mold is a mold for molding polypropylene, which is known as a material having a low molding shrinkage ratio. However, for Example 1, Comparative Example 1, Example 4, and Comparative Example 4 in which the treated mold is a mold for molding with molding materials that readily adhere to the mold surface, such as urethane elastomers or rubbers, it was confirmed that the demoldability exhibited by the molds of Example 1 and Example 4 was better than that of the molds of Comparative Example 1 and Comparative Example 4.

This confirmed that demoldability can be improved in molds for molding with molding materials having poor demoldability, such as elastomers and rubbers, by performing complex treatment in two stages, i.e. the preliminary treatment and the after treatment, as in the present invention. This was confirmed to be advantageous in improving demoldability compared to performing surface treatment by the spherical powder ejection alone (a process corresponding to the after treatment alone).

The invention claimed is:

1. A method of treating a surface of a mold of base material of only metal with processing marks comprising:
   a preliminary treatment process of dry-ejecting an angular carbide powder against the surface of the mold, of which the base material being of only metal, so as to cause elemental carbon present within the carbide powder to be diffused into the surface of the mold, the carbide powder having particle diameters not larger than those of a 220 grit particle distribution as defined by JIS R6001 (1987) and the carbide powder being dry-ejected at an ejection pressure of 0.2 MPa or greater; and
   following the preliminary treatment process, an after treatment process of dry-ejecting a spherical powder against the surface of the mold after treatment by the preliminary treatment process so as to cause the spherical powder to impact the surface of the mold and form circular arc shaped depressions in the mold surface, the spherical powder having a hardness not less than the hardness of the base material, of only metal, of the mold and particle diameters not larger than those of a 220 grit particle distribution as defined by JIS R6001 (1987) and being dry-ejected at an ejection pressure of 0.2 MPa or greater,
   as a result of performing both of the treatment processes, the processing marks are removed in a shorter time than when only the after treatment process is performed, and an adjustment that causes a hardness increase exceeding a sum of the hardness increase obtained only via the preliminary treatment process and the hardness increase obtained only via the after treatment process is performed.

2. The method of claim 1, wherein the mold is a mold for molding a resin.

* * * * *